United States Patent
Hays et al.

(10) Patent No.: US 8,359,308 B2
(45) Date of Patent: Jan. 22, 2013

(54) INLINE DATA CORRELATION AND HIERARCHICAL DATASETS

(75) Inventors: Christopher A. Hays, Monroe, WA (US); Robert M. Bruckner, Redmond, WA (US); John H. Vulner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 12/752,168

(22) Filed: Apr. 1, 2010

(65) Prior Publication Data
US 2011/0246447 A1 Oct. 6, 2011

(51) Int. Cl.
*G06F 17/30* (2006.01)
(52) U.S. Cl. ........................................ 707/714
(58) Field of Classification Search .............. 707/2, 714; 709/225; 715/764
See application file for complete search history.

(56) References Cited

U.S. PATENT DOCUMENTS

| | | | |
|---|---|---|---|
| 6,625,615 B2 * | 9/2003 | Shi et al. ........................ 1/1 |
| 7,437,373 B2 | 10/2008 | Whitehead | |
| 2005/0060647 A1 | 3/2005 | Doan et al. | |
| 2006/0047638 A1 | 3/2006 | Dettinger et al. | |
| 2006/0064428 A1 | 3/2006 | Colaco et al. | |
| 2006/0107196 A1 | 5/2006 | Thanu et al. | |
| 2007/0112727 A1 | 5/2007 | Jardine et al. | |
| 2008/0016086 A1 | 1/2008 | Chang et al. | |

OTHER PUBLICATIONS

"SeeMoreData", Retrieved at <<http://www.seemoredata.com/products/integration.php>>, Jan. 18, 2010.

* cited by examiner

*Primary Examiner* — Etienne Leroux
(74) *Attorney, Agent, or Firm* — Merchant & Gould P.C.

(57) ABSTRACT

Architecture which provides that certain data-bound objects in the report can be configured by the report author to use data from a specific query result rather than take data from the containing data bound object. The report author defines a relationship between the data in the contained object and the data in the container, allowing instances of the descendant object to be correlated with instances of the ancestor object. This relationship can be either explicit with join conditions or implicit due to an intrinsic hierarchical relationship between the query results.

20 Claims, 12 Drawing Sheets

INLINE DATA CORRELATION AND HIERARCHICAL DATASETS

BACKGROUND

Report authors commonly have a need to display related data from multiple sources. In some cases, the related data can be joined into a single query which returns a single dataset for use in the report. In many cases, however, the underlying data provider does not support such joins or the related data is in heterogeneous systems. In this case, report authors have an expectation that the "join" be performed within the report itself. In addition, when there are multiple different sets of dependent data ("multiple master-detail"—the master dataset contains the master data and the child datasets contain the detail data), even if the data provider supports joins it is neither practical nor efficient to join all of the data together in the query and then attempt to re-segment the data within the report.

With respect to support for natively hierarchical datasets, reporting systems currently support only tabular rowsets as data in datasets. For data sources which natively support hierarchical data, this mismatch requires a flattening process to be performed on the data by the reporting system before the data can be utilized within the report. Depending on the style of flattening, this can have undesired effects. Either the data is limited to a single branch of the hierarchy, which requires multiple queries to be executed in subreports to re-correlate the data, or the data is diagonalized, which requires careful placement of filters within the report to re-segment the data.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides that certain data-bound objects (generally as ancestors and descendants) in the report can be configured by the report author to use data from a specific query result rather than take data from the containing data bound object. The report author defines a relationship between the data in the contained object and the data in the container, allowing instances of a child object (a type of descendant; an immediate descendant to a parent object) to be correlated with instances of a parent object (a type of ancestor; an immediate ancestor to a child object). This relationship can be either explicit with join conditions or implicit due to an intrinsic hierarchical relationship between the query results.

Declarative binding of descendant data-bound objects to a different set of data than the ancestor object is facilitated with explicit join conditions used to correlate descendant data rows with ancestor data rows. Declarative binding of descendant data-bound objects to a different set of data than the ancestor object may alternatively be facilitated with an implicit correlation between descendant data rows and ancestor data rows based on a containment hierarchy relationship between the two sets of data. The above can be utilized multiple times for different descendant objects within the same ancestor object. Moreover, a method is provided to access data from ancestor and/or descendant data rows for calculations within the current data-bound object.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture provides that certain data-bound objects (generally as ancestors and descendants) in the report can be configured by a report author to use data from a specific query result rather than take data from the containing data bound object. The report author defines a relationship between the data in the contained object and the data in the container, allowing instances of a child object (a type of descendant; an immediate descendant to a parent object) to be correlated with instances of a parent object (a type of ancestor; an immediate ancestor to a child object). This relationship can be either explicit with join conditions or implicit due to an intrinsic hierarchical relationship between the query results.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
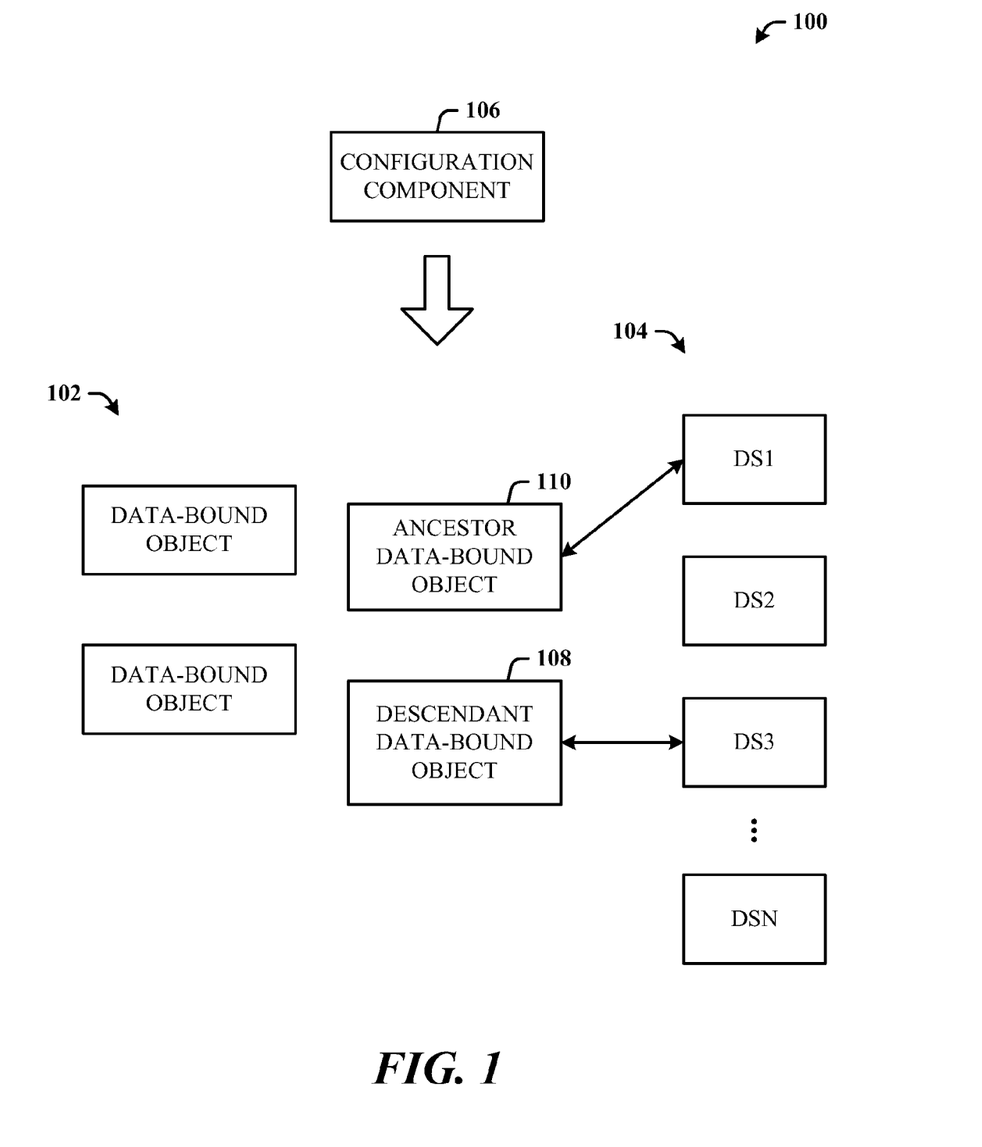
FIG. 1 illustrates a correlation system for creating declarative binding of objects to datasets in accordance with the disclosed architecture.

FIG. 1 illustrates a correlation system 100 for creating declarative binding of objects to datasets in accordance with the disclosed architecture. The system 100 includes an arrangement of data-bound objects 102 for presentation of data from associated datasets 104. A configuration component 106 enables the declarative correlation of, for example, a descendant data-bound object 108 to a dataset DS3 that is different than an ancestor (parent) dataset DS1 of an ancestor data-bound object 110.

The data-bound objects 102 can include nested groups. The configuration component 106 enables correlation of the descendant group to a dataset different than a dataset of a related ancestor group. The data objects 102 can include an object being a member of a row group or column group hierarchy. The configuration component 106 enables declarative correlation of a row group object to a first dataset (e.g., dataset DS1) and a column group object to a second dataset (e.g., dataset DS3). Moreover, the row group hierarchy and the column group hierarchy are independent such that each hierarchy includes a tree of groups. Each group in the tree can be, per the disclosed architecture, bound to a different data set than its ancestor group.

The descendant data-bound object 108 can be contained in the ancestor data-bound object 110 and descendant data rows of the different dataset DS3 can be declaratively correlated to ancestor data rows of the ancestor dataset DS1 based on explicit join conditions. The descendant data-bound object 108 can be contained in the ancestor data-bound object 110 and descendant data rows of the different dataset DS3 can be implicitly correlated to ancestor data rows of the ancestor dataset DS1 based on a containment hierarchy relationship between the different dataset DS3 and ancestor dataset DS1.

The ancestor data-bound object 110 can also contain multiple different descendant data-bound objects. The different descendant data-bound objects can be declaratively correlated to correspondingly different datasets based on explicit join conditions, and containment hierarchy relationships between the correspondingly different datasets and the ancestor dataset DS1. The configuration component 106 enables access to declarative properties of the data-bound objects for control over datasets used for the data-bound objects. These and other aspects are described in greater detail herein.

Figure 2:
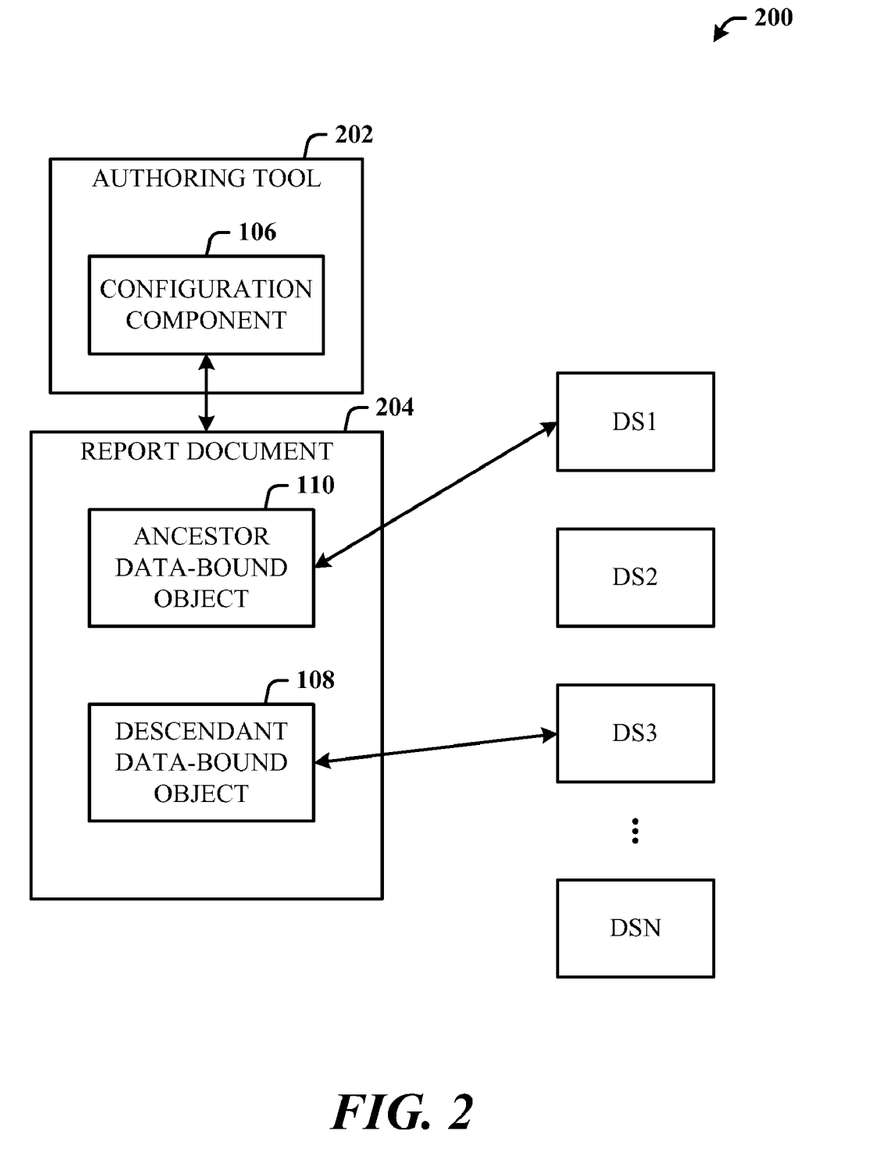
FIG. 2 illustrates a correlation system that employs an authoring tool for configuring declarative correlations between data-bound objects and datasets in a report document.

FIG. 2 illustrates a correlation system 200 that employs an authoring tool 202 for configuring declarative correlations between data-bound objects and datasets in a report document 204. For a specific set of data-bound objects (in the case of reporting services: DataRegion, Group, TablixCell, ChartDataPoint and DataValue), a set of declarative properties are made available to report authors which allows control over the set of data used for that object. By default, the data used for an object is taken from its containing object. Top-level objects in the report are bound explicitly to a dataset. A descendant object may be explicitly bound to a dataset other than the dataset used by the ancestor object(s). When a report author overrides the data binding in this way, a set of join conditions can also be specified. In the event the dataset bound to the descendant object is inherently a descendant dataset of an ancestor object's dataset, the rows in the descendant are automatically correlated with the rows in the ancestor.

As with all examples described herein, for inline data correlation, a join condition is specified; however, for hierarchical datasets, no join condition is specified, because the data correlation relationship is implicit.

Figure 3:
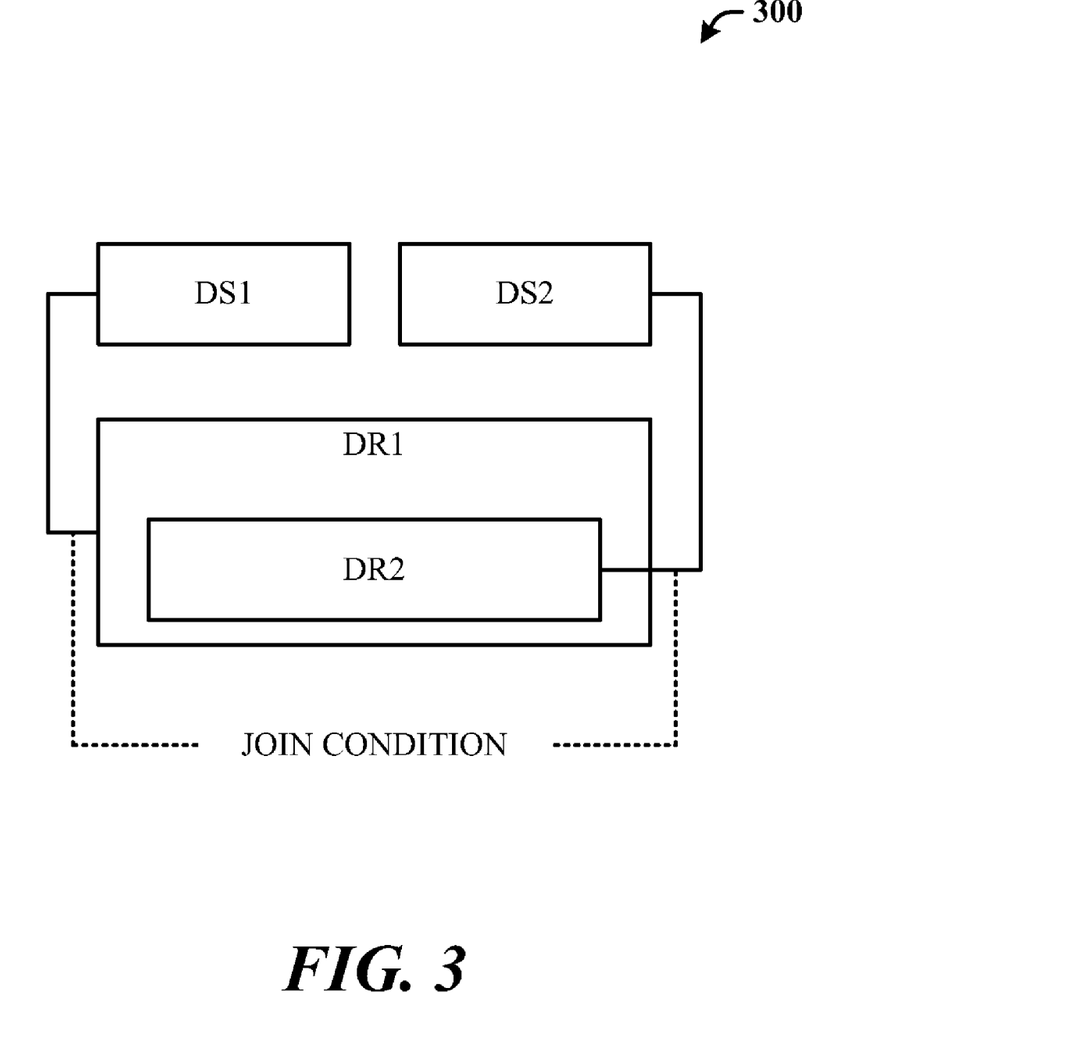
FIG. 3 illustrates a data correlation example of a nested data region join.

FIG. 3 illustrates a data correlation example of a nested data region (DR) join 300. The most basic case is where a nested data region (DR2) can take data from a dataset DS2 which is different from a dataset DS1 of its ancestor data region (DR1). The dataset DS1 is then correlated with the dataset DS2 such that rows of the dataset DS2 are now correlated with the rows of the dataset DS1 in an ancestor-descendant (e.g., parent-child) relationship. The user can define a query via the configuration component that enables access to the many different possible data sources to pull in data for presentation. Join conditions (e.g., FIELDS!DATASET1FIELDNAME=FIELDS!DATASET2-FIELDNAME) are established between the datasets DS1 and DS2.

Figure 4:
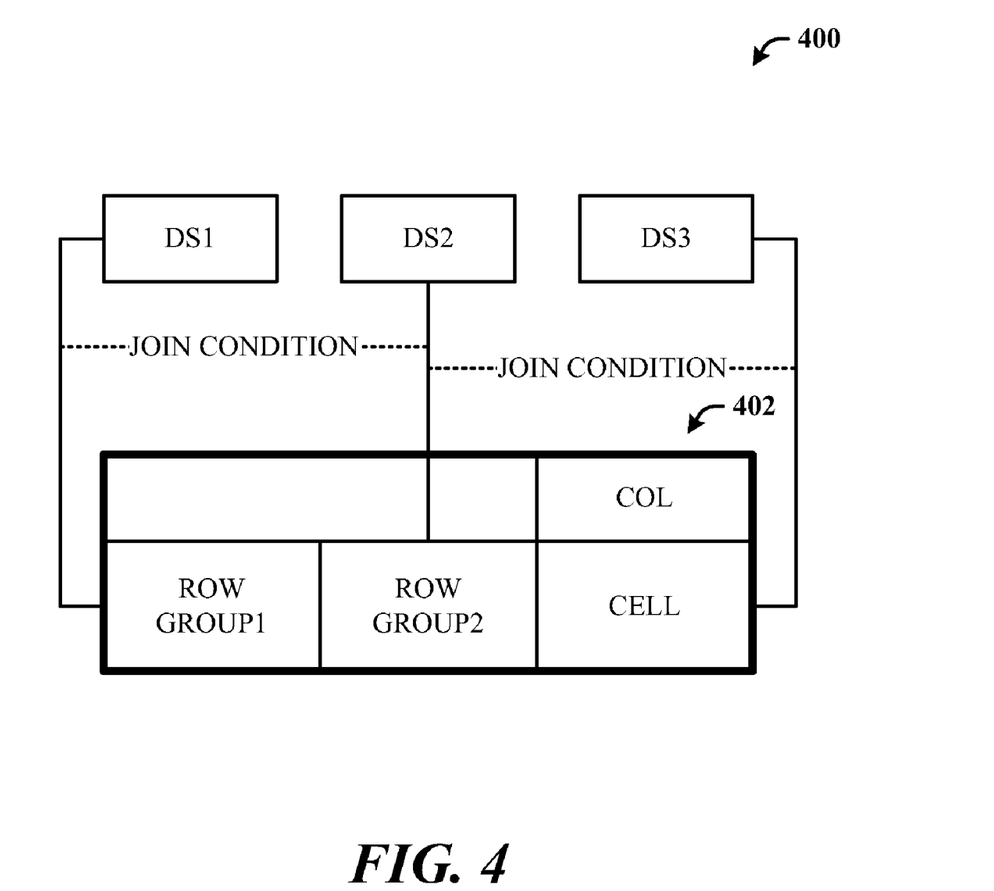
FIG. 4 illustrates a data correlation example of a nested group join.

FIG. 4 illustrates a data correlation example of a nested group join 400. In this case, a single data-bound object 402 (a tablix—a data region that is a layout report item which displays report data in cells organized into rows and columns) is considered that includes an outer group of rows RowGroup1, an inner group of rows RowGroup2, a cell Cell, and a column Col. The outer group of rows RowGroup1 takes its data from a dataset DS1. The inner group of rows RowGroup2 takes its data from a second dataset DS2 (which is related to the first dataset DS1 either via hierarchy or explicit join). The data in cell Cell of the tablix may come from the second dataset DS2, or optionally, from yet a third dataset DS3 (which is then related to the second dataset DS2 either via hierarchy or explicit join).

To get to this point, grouping has been performed on the row hierarchy (not on the columns). For example, in the outer most group RowGroup1, grouping can be by City, the inner row group RowGroup2 can be Customer, and the Cell can be Sales information. The data for the list of cities and the list of customers and the list of sales may be coming from different data stores rather than from a single query. Here, the outer group RowGroup1 retrieves data from dataset DS1, the inner group RowGroup2 retrieves its data from the dataset DS2, and inside, those details get bound to dataset DS3. Thus, data is coming from the different datasets. Declarative correlation, as configured by the user, is by way of joins between datasets DS1 and DS2, and datasets DS2 and DS3.

Figure 5:
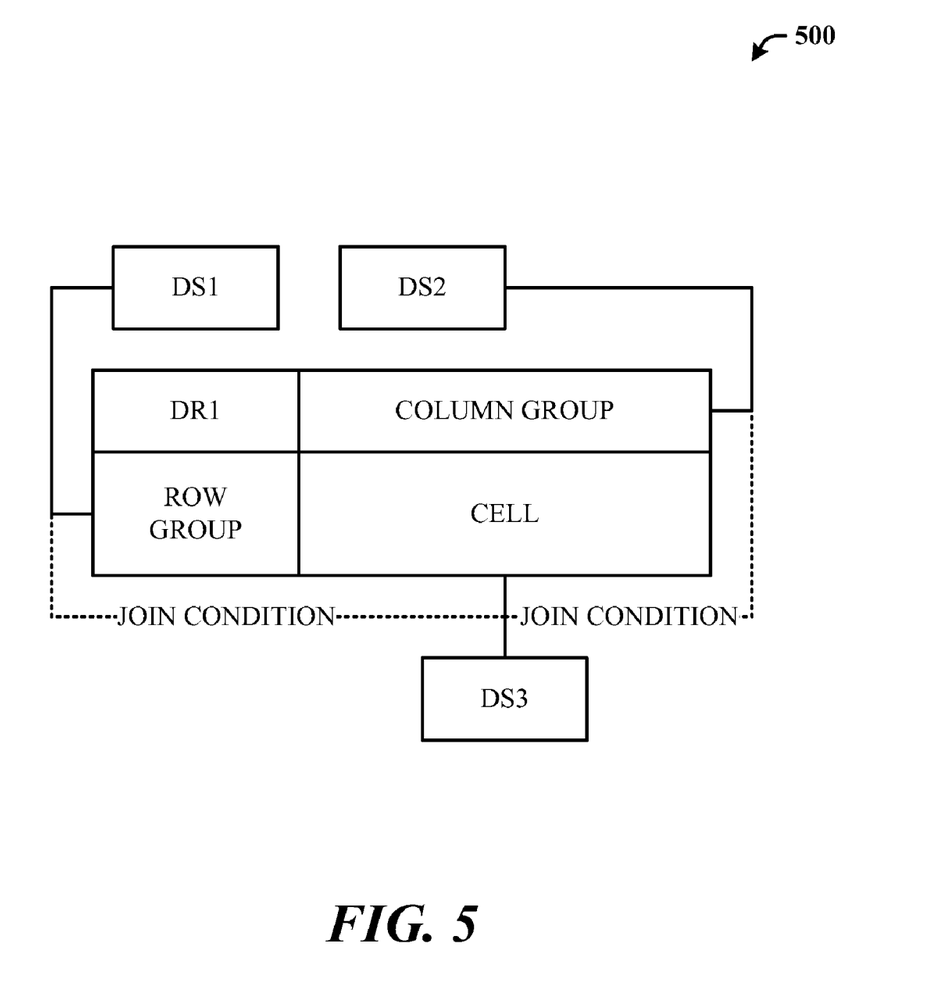
FIG. 5 illustrates a matrix join.

FIG. 5 illustrates a matrix join 500. A matrix displays data grouped by row and column. In this case, the row hierarchy and column hierarchy for a tablix are each taken from different respective datasets DS1 and DS2. The data in the cell Cell of the tablix comes from a third dataset DS3 which is be related (via hierarchy or join) to the datasets DS1 and DS2 used by the innermost members of both the row and column hierarchies. Here, a join condition correlates the datasets DS1, DS2, and DS3.

Note that there may be cases where the same dataset is used multiple times in the matrix with different join conditions. For example, consider a City dataset and a Shipment dataset being used in a matrix which counts shipments by source and destination city. In this case, the same dataset is used for both the column and row hierarchies, but the join conditions used to relate the data in the cell are different for each hierarchy. For this reason, joins are defined at the groups/data regions, rather than only at the datasets (although typically the join conditions defined on a dataset can be sufficient to use by default).

Figure 6:
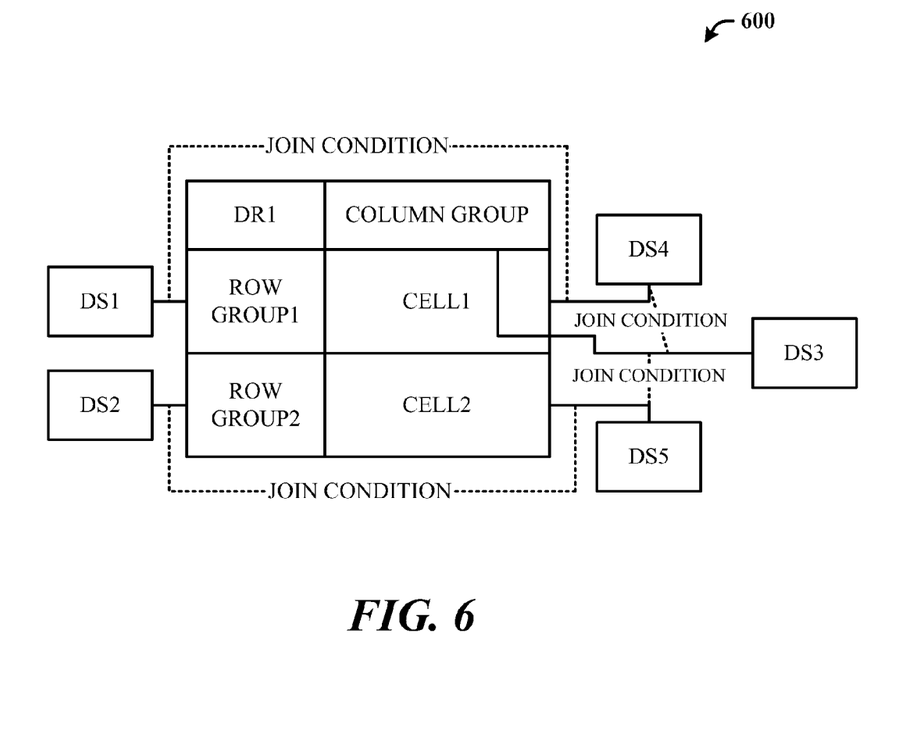
FIG. 6 illustrates a peer dynamic join.

FIG. 6 illustrates a peer dynamic join 600. Extending this case to cover peer dynamic members shows that each column hierarchy member, ColumnGroup, or row hierarchy member RowGroup1 and RowGroup2, can be bound to a separate datasets. Here, the two different row groups are adjacent and essentially unrelated. As a result, each cell in the tablix can be bound to a different dataset (with relationships to the corresponding innermost hierarchy members on each hierarchy).

For example, there is one column for one year (ColumnGroup), and for each year the user wants to see a breakdown of sales by Product (RowGroup1). Separately, the user wants to see a breakdown of returns by Region (RowGroup2). This can be selected in different ways. Additionally, the user wants to insert this information into the same data-bound object. In the case of Products, RowGroup1 is bound to the list of products (DS1). The RowGroup2 is bound to the list of Regions (DS2). The ColumnGroup is bound to dataset DS3 for the list of years. Because there are completely different dataset sources for sales and returns, the Sales for that first cell Cell1 is bound to dataset DS4 and the second cell Cell2 is bound to dataset DS5. Note join conditions are provided between dataset DS4 and only datasets DS1 and DS3 (not DS1 or DS5), whereas dataset DS5 is correlated by join conditions to only datasets DS2 and DS3.

Figure 7:
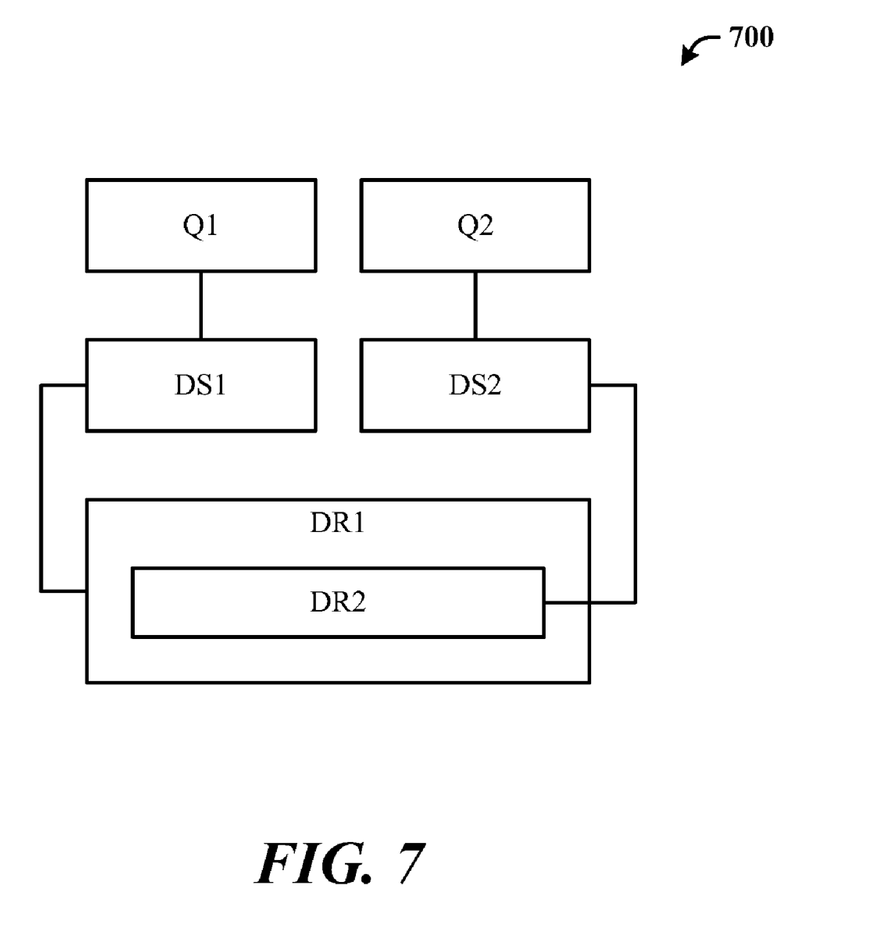
FIG. 7 illustrates an inline data correlation using query-based data extraction from a dataset.

FIG. 7 illustrates an inline data correlation 700 using query-based data extraction from a dataset. Here, no joins are shown, although such correlations can be employed. Data from a dataset DS1 can be pulled into the associated data-bound object (data region (DR1)) based on a query Q1. Similarly, data from a dataset DS2 can be pulled into the associated data-bound object (data region (DR2)) based on a query Q2.

The join conditions can be employed when using the datasets nested inside of data region DR1 and inside of data region DR2. Consider a report intended to show customers and their sales. A customer query (Q1) could return a list of information about customers, such as first name, last name and Customer ID. A sales query (Q2) could then return a list of information about sales, such as the name of the product purchased, the date the sale was made, the quantity and customer ID. The two resulting datasets DS1 and DS2 could then be correlated via join conditions. However, if the underlying source of data supports hierarchal datasets, a single query can effectively return multiple datasets.

Figure 8:
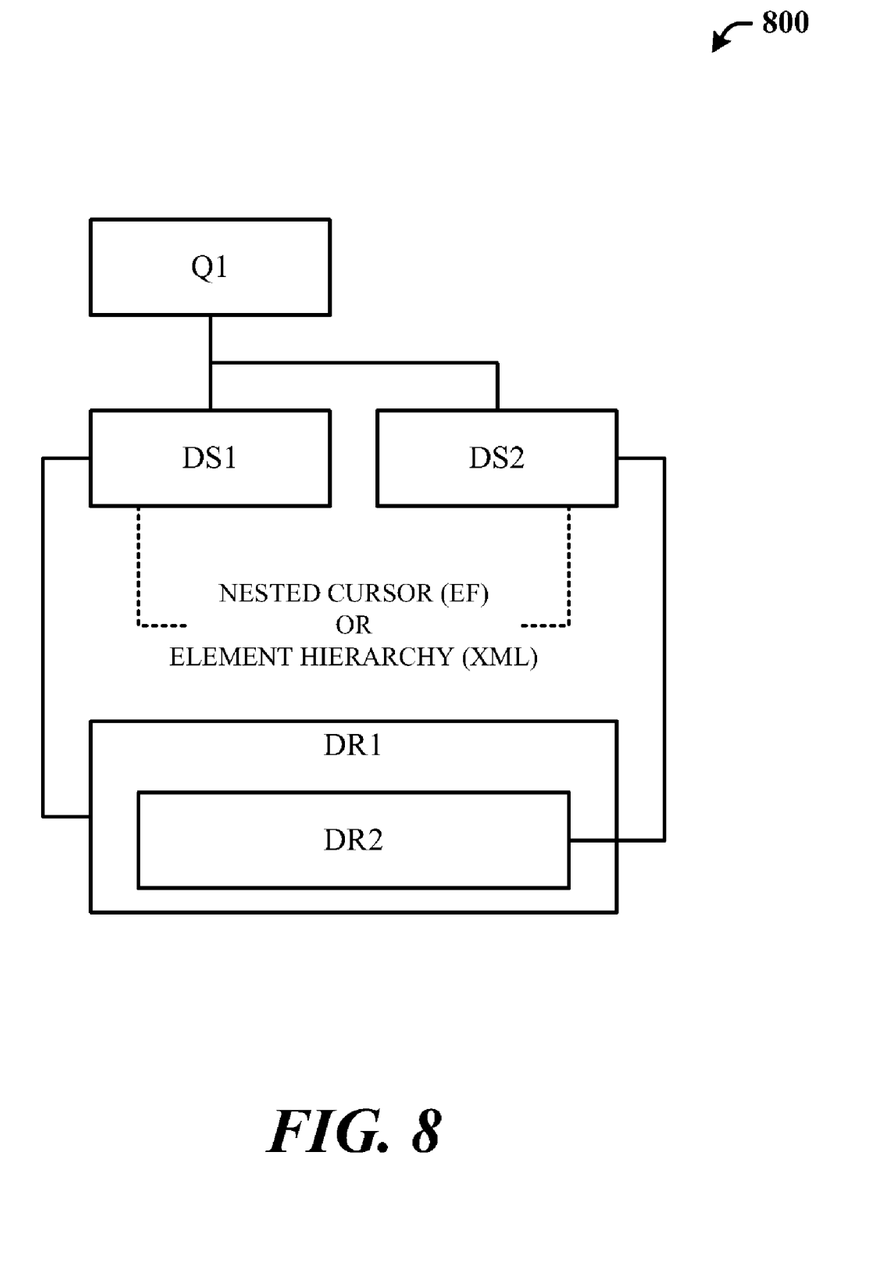
FIG. 8 illustrates hierarchical datasets using query-based data extraction from a dataset.

FIG. 8 illustrates hierarchical datasets 800 using query-based data extraction from a dataset. Here, a single query Q1 results in both datasets DS1 and DS2. As in the above example, both customer and sales information is returned. All this information can be returned nested (just as in an XML file), but this information is treated internally as if being two datasets—one for customers (dataset DS1) and one for sales (dataset DS2). The dataset DS2 information can be logically indicated that a join exists between the datasets DS1 and DS2, meaning dataset DS2 information is intrinsically correlated with the dataset DS1 information. Since the data arrives from the data source as pre-nested, it is difficult to break the data apart. Thus, when using dataset DS1 in data region DR1 and dataset DS2 in data region DR2, it is known that the objects are pre-nested and do not have to author the join.

Figure 9:
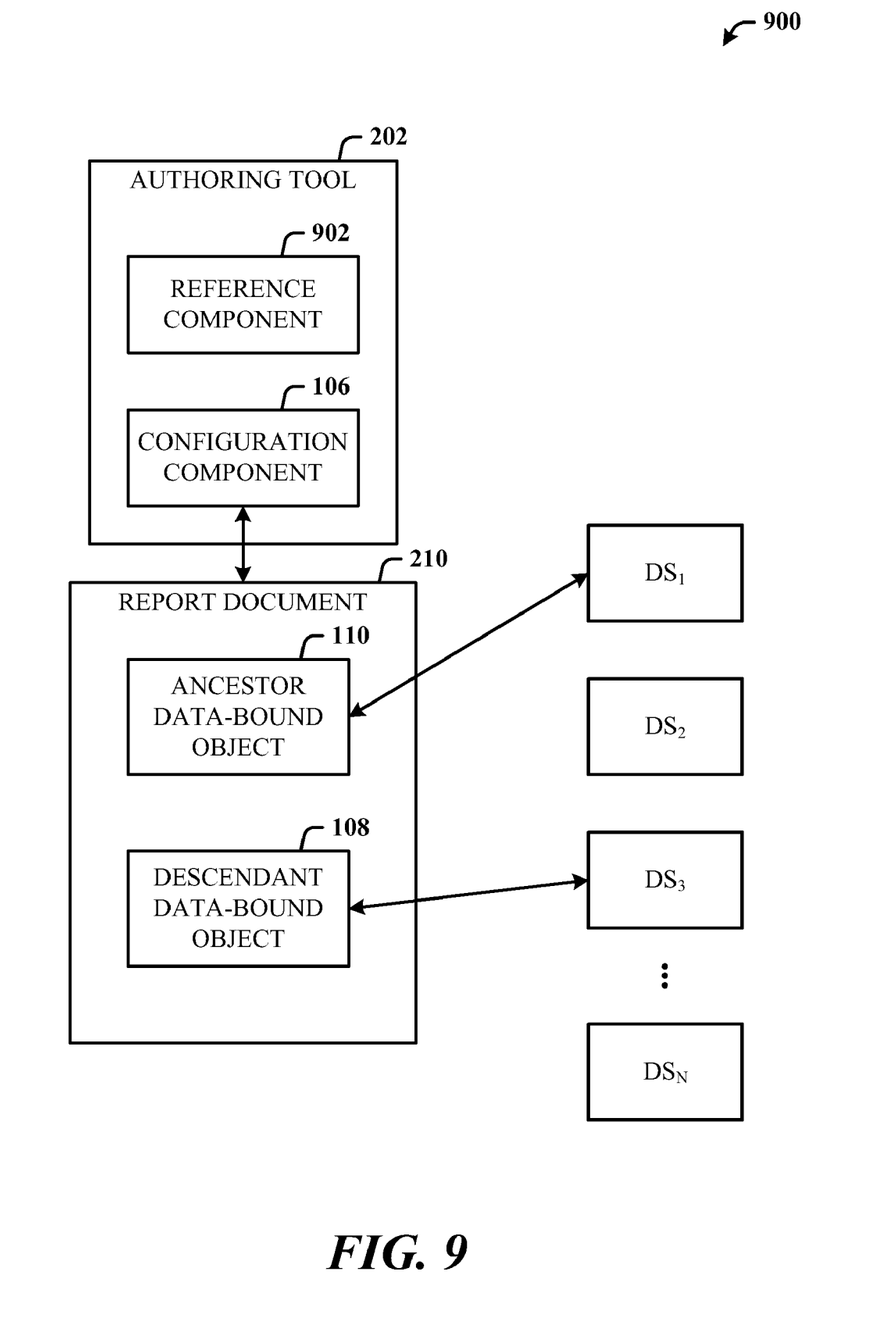
FIG. 9 illustrates a system that employs a reference component as part of the authoring component.

FIG. 9 illustrates a system 900 that employs a reference component 902 as part of the authoring component 202. The reference component 902 allows the establishment of ancestor and/or descendant references to ancestor and/or descendant data-bound objects, and values of data related to the ancestor and/or descendant objects are retrieved and aggregated based on the ancestor and/or descendant references. In addition to correlating data, it may be desirable to get at the correlated data within calculations in the report. Language can be exposed in an underlying expression to reach up to ancestor datasets. The ability to access data from ancestor and/or descendant data rows for calculations within the current data-bound object is provided via a context-sensitive collection of "scopes" (or references to the data-bound objects). By accessing this collection, values of the data for ancestor scopes can be retrieved. For example, Scopes ("ParentGroup").Fields("Field1").Value returns the value of Field1 from the row of the dataset bound to the ParentGroup, which corresponds to the current row in the data bound object where this expression is used.

Similarly, values of data for descendant scopes can be retrieved and aggregated. For example: Sum(Scopes("ChildGroup").Fields("Field1").Value) sums the values of Field1 from all rows of the dataset bound to the ChildGroup which correspond to the current row in the data bound object where this expression is used.

Thus, from within a descendant object, data can be accessed from the ancestor object (an ancestor group) and then get a particular value from that ancestor group. This can be performed in the reverse as well. In other words, from the ancestor group, data can be obtained for a contained descendant group.

Put another way, a correlation system is provided comprising an arrangement of data-bound objects for presentation of data from associated datasets, a configuration component that enables declarative correlation of a descendant data-bound object to a dataset different than an ancestor dataset of an ancestor data-bound object, the configuration component enables access to declarative properties of the data-bound objects for control over datasets used for the data-bound objects. The system also includes a reference component that establishes references between data-bound objects to retrieve values of data from at least one of ancestor or descendant data-bound objects, the reference component allows establishment of at least one of ancestor or descendant references to at least one of ancestor or descendant data-bound objects, and values of data related to the at least one of ancestor or descendant objects are retrieved based on the at least one of ancestor or descendant references.

The descendant data-bound object is contained in the ancestor data-bound object and descendant data rows of the different dataset are declaratively correlated to ancestor data rows of the ancestor dataset based on explicit join conditions. The descendant data-bound object is contained in the ancestor data-bound object and descendant data rows of the different dataset are implicitly correlated to ancestor data rows of the ancestor dataset based on a containment hierarchy relationship between the different dataset and ancestor dataset.

The ancestor data-bound object contains multiple different descendant data-bound objects, the different descendant data-bound objects declaratively correlated to correspondingly different datasets based on explicit join conditions, and containment hierarchy relationships between the correspondingly different datasets and the ancestor dataset. The data-bound objects include an object having a nested group and an object having a row group hierarchy and a column group hierarchy, the configuration component enables correlation of the nested group to a dataset different than a dataset of a related ancestor group, and enables declarative correlation of the row group to a first dataset and the column group to a second dataset, and a cell of the data-bound object to a third dataset.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
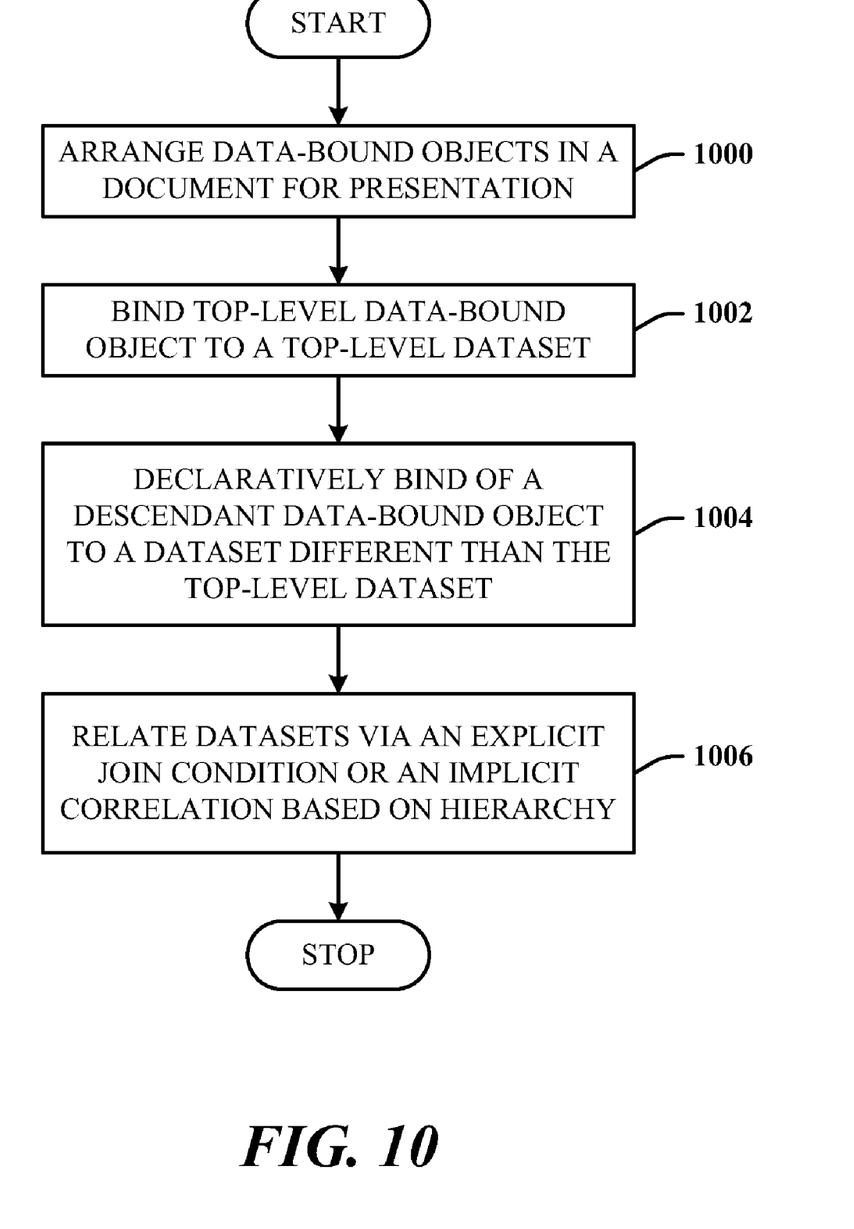
FIG. 10 illustrates a computer-implemented correlation method in accordance with the disclosed architecture.

FIG. 10 illustrates a computer-implemented correlation method in accordance with the disclosed architecture. At 1000, data-bound objects are arranged in a document for presentation. At 1002, a top-level data-bound object is bound to a top-level dataset. At 1004, a descendant data-bound object is declaratively bound to a dataset different than the top-level dataset. At 1006, the datasets are related via an explicit join condition or an implicit correlation based on hierarchy.

Figure 11:
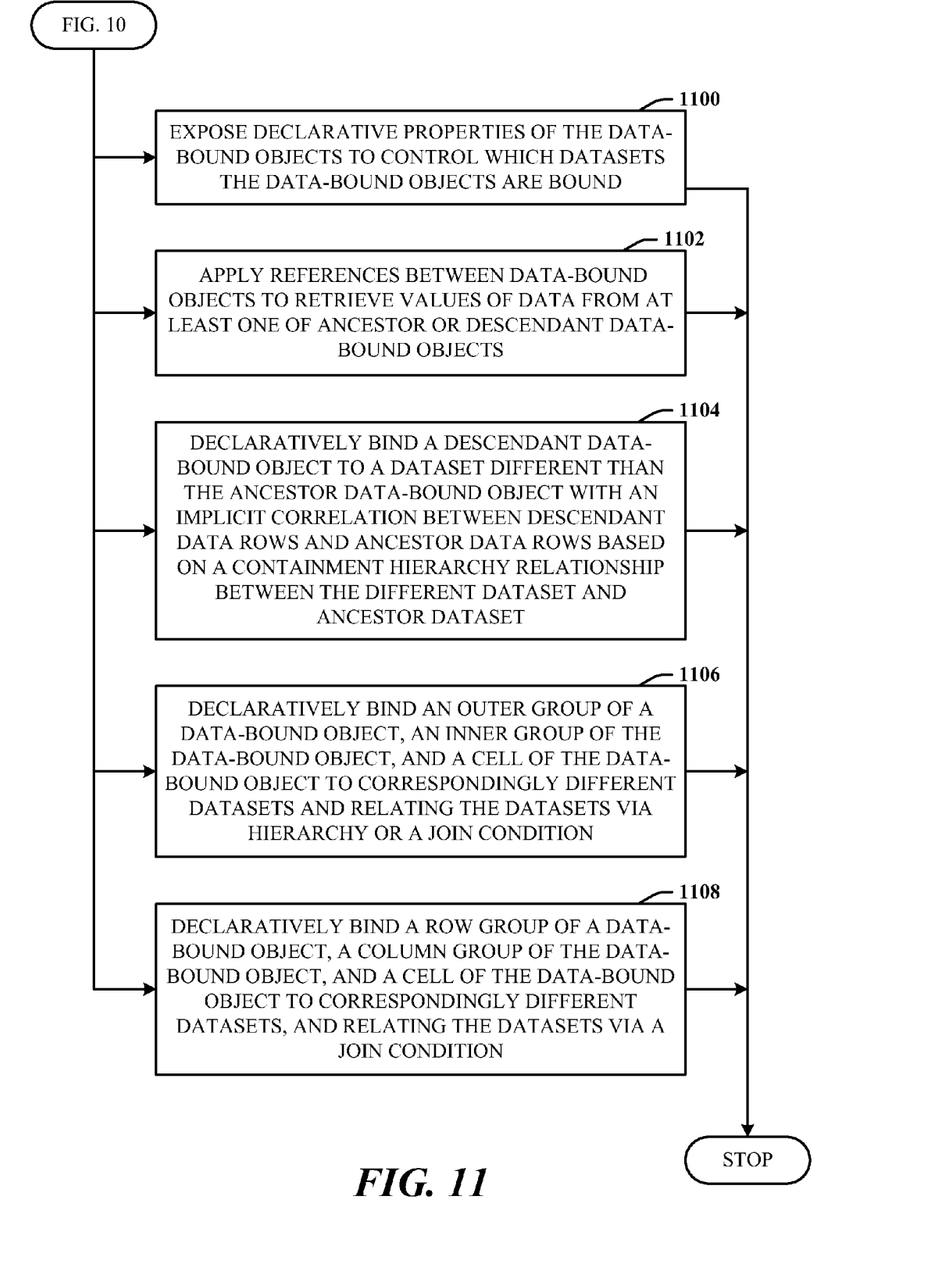
FIG. 11 illustrates further aspects of the method of FIG. 10.

FIG. 11 illustrates further aspects of the method of FIG. 10. At 1100, declarative properties of the data-bound objects are exposed to control which datasets the data-bound objects are bound. At 1102, references are applied between data-bound objects to retrieve values of data from at least one of ancestor or descendant data-bound objects. At 1104, a descendant data-bound object is declaratively bound to a dataset different than the ancestor data-bound object with an implicit correlation between descendant data rows and ancestor data rows based on a containment hierarchy relationship between the different dataset and ancestor dataset. At 1106, an outer group of a data-bound object, an inner group (e.g., row or column) of the data-bound object, and a cell of the data-bound object are declaratively bound to correspondingly different datasets and relating the datasets via hierarchy or a join condition. At 1108, a row group of a data-bound object, a column group of the data-bound object, and a cell of the data-bound object are declaratively bound to correspondingly different datasets, and relating the datasets via a join condition.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 12:
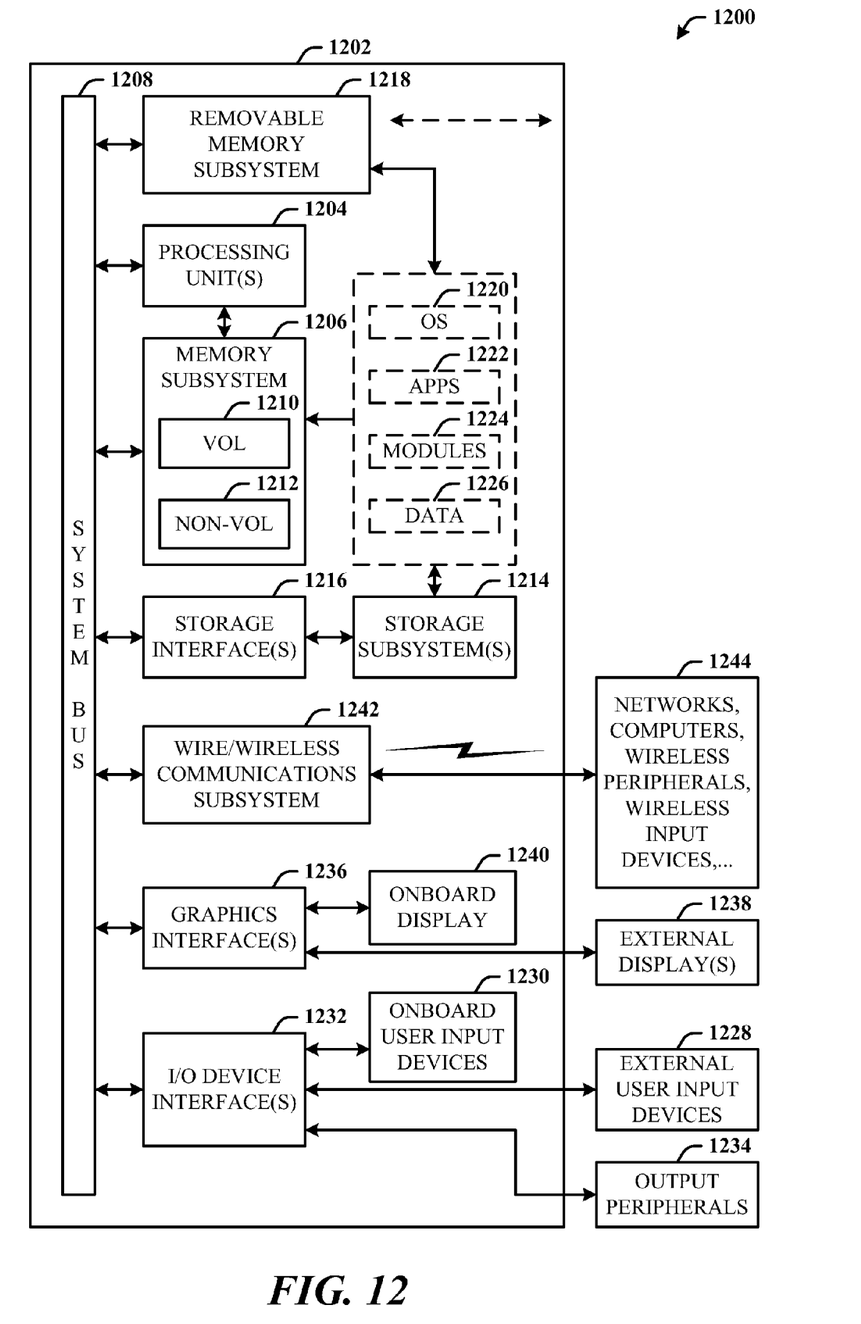
FIG. 12 illustrates a block diagram of a computing system that executes correlation in accordance with the disclosed architecture.

Referring now to FIG. 12, there is illustrated a block diagram of a computing system 1200 that executes correlation in accordance with the disclosed architecture. In order to provide additional context for various aspects thereof, FIG. 12 and the following description are intended to provide a brief, general description of the suitable computing system 1200 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1200 for implementing various aspects includes the computer 1202 having processing unit(s) 1204, a computer-readable storage such as a system memory 1206, and a system bus 1208. The processing unit(s) 1204 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, micro-processor-based or programmable consumer electronics, and the like, each of which can be operatively coupled to one or more associated devices.

The system memory 1206 can include computer-readable storage (physical storage media) such as a volatile (VOL) memory 1210 (e.g., random access memory (RAM)) and non-volatile memory (NON-VOL) 1212 (e.g., ROM, EPROM, EEPROM, etc.). A basic input/output system (BIOS) can be stored in the non-volatile memory 1212, and includes the basic routines that facilitate the communication of data and signals between components within the computer 1202, such as during startup. The volatile memory 1210 can also include a high-speed RAM such as static RAM for caching data.

The system bus 1208 provides an interface for system components including, but not limited to, the system memory 1206 to the processing unit(s) 1204. The system bus 1208 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1202 further includes machine readable storage subsystem(s) 1214 and storage interface(s) 1216 for interfacing the storage subsystem(s) 1214 to the system bus 1208 and other desired computer components. The storage subsystem(s) 1214 (physical storage media) can include one or more of a hard disk drive (HDD), a magnetic floppy disk drive (FDD), and/or optical disk storage drive (e.g., a CD-ROM drive DVD drive), for example. The storage interface(s) 1216 can include interface technologies such as EIDE, ATA, SATA, and IEEE 1394, for example.

One or more programs and data can be stored in the memory subsystem 1206, a machine readable and removable memory subsystem 1218 (e.g., flash drive form factor technology), and/or the storage subsystem(s) 1214 (e.g., optical, magnetic, solid state), including an operating system 1220, one or more application programs 1222, other program modules 1224, and program data 1226.

The one or more application programs 1222, other program modules 1224, and program data 1226 can include the entities and components of the system 100 of FIG. 1, the entities and components of the system 200 of FIG. 2, the examples and of FIGS. 3-8, the entities and components of the system 900 of FIG. 9, and the methods represented by the flowcharts of FIGS. 10 and 11, for example.

Generally, programs include routines, methods, data structures, other software components, etc., that perform particular tasks or implement particular abstract data types. All or portions of the operating system 1220, applications 1222, modules 1224, and/or data 1226 can also be cached in memory such as the volatile memory 1210, for example. It is to be appreciated that the disclosed architecture can be implemented with various commercially available operating systems or combinations of operating systems (e.g., as virtual machines).

The storage subsystem(s) 1214 and memory subsystems (1206 and 1218) serve as computer readable media for volatile and non-volatile storage of data, data structures, computer-executable instructions, and so forth. The instructions can exist on non-transitory media. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1202 and includes volatile and non-volatile internal and/or external media that is removable or non-removable. For the computer 1202, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1202, programs, and data using external user input devices 1228 such as a keyboard and a mouse. Other external user input devices 1228 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1202, programs, and data using onboard user input devices 1230 such a touchpad, microphone, keyboard, etc., where the computer 1202 is a portable computer, for example. These and other input devices are connected to the processing unit(s) 1204 through input/output (I/O) device interface(s) 1232 via the system bus 1208, but can be connected by other interfaces such as a parallel port, IEEE 1394 serial port, a game port, a USB port, an IR interface, etc. The I/O device interface(s) 1232 also facilitate the use of output peripherals 1234 such as printers, audio devices, camera devices, and so on, such as a sound card and/or onboard audio processing capability.

One or more graphics interface(s) 1236 (also commonly referred to as a graphics processing unit (GPU)) provide graphics and video signals between the computer 1202 and external display(s) 1238 (e.g., LCD, plasma) and/or onboard displays 1240 (e.g., for portable computer). The graphics interface(s) 1236 can also be manufactured as part of the computer system board.

The computer 1202 can operate in a networked environment (e.g., IP-based) using logical connections via a wired/wireless communications subsystem 1242 to one or more networks and/or other computers. The other computers can include workstations, servers, routers, personal computers, microprocessor-based entertainment appliances, peer devices or other common network nodes, and typically include many or all of the elements described relative to the computer 1202. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1202 connects to the network via a wired/wireless communication subsystem 1242 (e.g., a network interface adapter, onboard transceiver subsystem, etc.) to communicate with wired/wireless networks, wired/wireless printers, wired/wireless input devices 1244, and so on. The computer 1202 can include a modem or other means for establishing communications over the network. In a networked environment, programs and data relative to the computer 1202 can be stored in the remote memory/storage device, as is associated with a distributed system. It will be appreciated that the network connections shown are exemplary and other means of establishing a communications link between the computers can be used.

The computer 1202 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented correlation system having computer readable media that store executable instructions executed by a processor, comprising:
    an arrangement of data-bound objects for presentation of data from associated datasets; and
    a configuration component that enables declarative correlation of a descendant data-bound object to a dataset different than an ancestor dataset of an ancestor data-bound object.

2. The system of claim 1, wherein the descendant data-bound object is contained in the ancestor data-bound object and descendant data rows of the different dataset are declaratively correlated to ancestor data rows of the ancestor dataset based on explicit join conditions.

3. The system of claim 1, wherein the descendant data-bound object is contained in the ancestor data-bound object and descendant data rows of the different dataset are implicitly correlated to ancestor data rows of the ancestor dataset based on a containment hierarchy relationship between the different dataset and ancestor dataset.

4. The system of claim 1, wherein the ancestor data-bound object contains multiple different descendant data-bound objects, the different descendant data-bound objects declaratively correlated to correspondingly different datasets based on explicit join conditions, and containment hierarchy relationships between the correspondingly different datasets and the ancestor dataset.

5. The system of claim 1, wherein the data-bound objects include a nested group, the configuration component enables correlation of the nested group to a dataset different than a dataset of an ancestor group.

6. The system of claim 1, wherein the data objects include an object being a member of a row group hierarchy or a column group hierarchy, the configuration component enables declarative correlation of the row group to a first dataset and the column group to a second dataset.

7. The system of claim 1, wherein the configuration component enables access to declarative properties of the data-bound objects for control over datasets used for the data-bound objects.

8. The system of claim 1, further comprising a reference component that establishes references between data-bound objects to retrieve values of data from ancestor data-bound objects.

9. The system of claim 8, wherein the reference component allows establishment of at least one of ancestor or descendant references to at least one of ancestor or descendant data-bound objects, and values of data related to the at least one of ancestor or descendant objects are retrieved and aggregated based on the at least one of ancestor or descendant references.

10. A computer-implemented correlation system having computer readable media that store executable instructions executed by a processor, comprising:
    an arrangement of data-bound objects for presentation of data from associated datasets;
    a configuration component that enables declarative correlation of a descendant data-bound object to a dataset different than an ancestor dataset of an ancestor data-bound object, the configuration component enables access to declarative properties of the data-bound objects for control over datasets used for the data-bound objects; and
    a reference component that establishes references between data-bound objects to retrieve values of data from at least one of ancestor or descendant data-bound objects, the reference component allows establishment of at least one of ancestor or descendant references to at least one of ancestor or descendant data-bound objects, and values of data related to the at least one of ancestor or descendant objects are retrieved based on the at least one of ancestor or descendant references.

11. The system of claim 10, wherein the descendant data-bound object is contained in the ancestor data-bound object and descendant data rows of the different dataset are declaratively correlated to ancestor data rows of the ancestor dataset based on explicit join conditions.

12. The system of claim 10, wherein the descendant data-bound object is contained in the ancestor data-bound object and descendant data rows of the different dataset are implicitly correlated to ancestor data rows of the ancestor dataset based on a containment hierarchy relationship between the different dataset and ancestor dataset.

13. The system of claim 10, wherein the ancestor data-bound object contains multiple different descendant data-bound objects, the different descendant data-bound objects declaratively correlated to correspondingly different datasets based on explicit join conditions, and containment hierarchy relationships between the correspondingly different datasets and the ancestor dataset.

14. The system of claim 10, wherein the data-bound objects include an object having a nested group and an object having a row group hierarchy and a column group hierarchy, the configuration component enables correlation of the nested group to a dataset different than a dataset of an ancestor group, and enables declarative correlation of the row group to a first dataset and the column group to a second dataset, and a cell of the data-bound object to a third dataset.

15. A computer-implemented correlation method executable by a processor and memory, comprising:
    arranging data-bound objects in a document for presentation;
    binding a top-level data-bound object to a top-level dataset;
    declaratively binding of a descendant data-bound object to a dataset different than the top-level dataset; and
    relating the datasets via an explicit join condition or an implicit correlation based on hierarchy.

16. The method of claim 15, further comprising exposing declarative properties of the data-bound objects to control which datasets the data-bound objects are bound.

17. The method of claim 15, further comprising applying references between data-bound objects to retrieve values of data from at least one of ancestor or descendant data-bound objects.

18. The method of claim 15, further comprising declaratively binding a descendant data-bound object to a dataset different than the ancestor data-bound object with an implicit correlation between descendant data rows and ancestor data rows based on a containment hierarchy relationship between the different dataset and ancestor dataset.

19. The method of claim 15, further comprising declaratively binding an outer group of a data-bound object, an inner group of the data-bound object, and a cell of the data-bound object to correspondingly different datasets and relating the datasets via hierarchy or a join condition.

20. The method of claim 15, further comprising declaratively binding a row group of a data-bound object, a column group of the data-bound object, and a cell of the data-bound object to correspondingly different datasets, and relating the datasets via a join condition.

* * * * *